US008549402B2

(12) United States Patent  (10) Patent No.: US 8,549,402 B2
Moore et al.  (45) Date of Patent: Oct. 1, 2013

(54) SYSTEM AND METHOD FOR PROVIDING INTERNET RADIO SERVICE

(76) Inventors: Joseph Harold Moore, Brentwood, TN (US); Stephen Rhett Davis, Nashville, TN (US)

( * ) Notice: Subject to any disclaimer, the term of this patent is extended or adjusted under 35 U.S.C. 154(b) by 661 days.

(21) Appl. No.: 12/345,287

(22) Filed: Dec. 29, 2008

(65) Prior Publication Data

US 2009/0177967 A1  Jul. 9, 2009

Related U.S. Application Data

(60) Provisional application No. 61/017,539, filed on Dec. 29, 2007.

(51) Int. Cl.
*G06F 3/00* (2006.01)

(52) U.S. Cl.
USPC ........... 715/716; 715/727; 715/728; 715/730; 715/810; 706/21

(58) Field of Classification Search
USPC ............ 715/716, 727–728, 730, 810; 706/21
See application file for complete search history.

(56) References Cited

U.S. PATENT DOCUMENTS

| | | | |
|---|---|---|---|
| 7,735,018 B2 * | 6/2010 | Bakhash | 715/782 |
| 7,814,418 B2 * | 10/2010 | Chosokabe | 715/273 |
| 2003/0074421 A1 * | 4/2003 | Kusano et al. | 709/219 |
| 2003/0103079 A1 * | 6/2003 | Adatia et al. | 345/762 |
| 2004/0013416 A1 * | 1/2004 | Mok | 386/125 |
| 2005/0010653 A1 * | 1/2005 | McCanne | 709/219 |
| 2006/0195789 A1 * | 8/2006 | Rogers et al. | 715/727 |
| 2006/0195790 A1 * | 8/2006 | Beaupre et al. | 715/727 |
| 2007/0050262 A1 * | 3/2007 | Van Breemen et al. | 705/26 |
| 2007/0078959 A1 * | 4/2007 | Ye | 709/223 |
| 2007/0085840 A1 * | 4/2007 | Asaka et al. | 345/173 |
| 2007/0124309 A1 * | 5/2007 | Takase et al. | 707/10 |
| 2007/0172131 A1 * | 7/2007 | Chosokabe | 382/224 |
| 2007/0252851 A1 * | 11/2007 | Ogata et al. | 345/619 |
| 2007/0288647 A1 * | 12/2007 | Humphrey et al. | 709/230 |
| 2008/0021851 A1 * | 1/2008 | Alcalde et al. | 706/21 |
| 2008/0059911 A1 * | 3/2008 | Kulo et al. | 715/853 |
| 2008/0062141 A1 * | 3/2008 | Chandhri | 345/173 |
| 2008/0133767 A1 * | 6/2008 | Birrer et al. | 709/231 |

(Continued)

OTHER PUBLICATIONS

Singh et al.; Architecture for Automated Tagging and Clustering of Song Files According to Mood; Jul. 2010; IJCSI International Journal of Computer Science Issues, vol. 7, Issue 4, No. 2; 7 pages.*

(Continued)

*Primary Examiner* — Linh K Pham
(74) *Attorney, Agent, or Firm* — Wayne Edward Ramage; Baher Donelson

(57) ABSTRACT

A stand-alone desktop application (i.e., client) that resides on an end user's local computer and receives customized music playlists and content via the Internet from a network of distributed servers. The end user may install the application in a variety of ways, including, but not limited to, downloading it from the Internet or installing it from a CD that has been pre-loaded with the client. Songs downloaded through the application may be cached locally. The application forms a playlist based on user-entered preferences, an analysis of music already existing on the computer, and previous user interactions with the application. Similar or related songs, albums, bands, or artists can be displayed graphically in a "song cloud" around a graphical representation of the song being played.

10 Claims, 13 Drawing Sheets

(56) References Cited

U.S. PATENT DOCUMENTS

| | | | |
|---|---|---|---|
| 2008/0141134 A1* | 6/2008 | Miyazaki et al. | 715/716 |
| 2009/0158155 A1* | 6/2009 | Quinn et al. | 715/716 |
| 2010/0042664 A1* | 2/2010 | Pampalk et al. | 707/750 |
| 2010/0095212 A1* | 4/2010 | Torrens et al. | 715/727 |
| 2010/0280642 A1* | 11/2010 | Sakata | 700/94 |
| 2010/0313166 A1* | 12/2010 | Nakayama et al. | 715/810 |
| 2011/0072955 A1* | 3/2011 | Turner | 84/612 |
| 2013/0014059 A1* | 1/2013 | Nakayama | 715/835 |

OTHER PUBLICATIONS

Danielle Stevens; The Music in the Clouds A Look Into Cloud Services for Music; 2009; 13 pages.*

* cited by examiner

SYSTEM AND METHOD FOR PROVIDING INTERNET RADIO SERVICE

This application claims priority to Provisional Patent Application No. 61/017,539, filed Dec. 29, 2007, entitled "System and Method for Providing Internet Radio Service," and is entitled to that filing date for priority. The complete disclosure, specification, drawings and attachments of Provisional Patent Application No. 61/017,539 are incorporated herein in their entirety by reference.

FIELD OF INVENTION

This invention relates to a system and method for providing radio service, customized music playlists, and content via the Internet.

SUMMARY

In one embodiment, the present invention comprises a stand-alone desktop application (i.e., client) that resides on an end user's local computer and receives customized music playlists and content via the Internet from a network of distributed servers. The end user may install the application in a variety of ways, including, but not limited to, downloading it from the Internet or installing it from a CD that has been pre-loaded with the client.

The application, once installed, can be activated or launched on the user's computer in a number of ways, including, but not limited to, clicking on an icon located on the desktop or within their task bar. In one exemplary embodiment, when the application is launched a small player or icon appears unobtrusively docked in the user's task bar. The player can be moved around the screen to suit the user's preference but, unless moved, the player will remain stationary in the task bar and therefore will not interfere with the user's active desktop area.

The appearance of the player in streamlined form may comprise several function buttons and a prominent sponsor logo. Function buttons from left to right include, but are not limited to, an information icon, sound volume control, pause/play, a skip feature, and a clock icon. When the user rolls his or her cursor over the information icon a small window, which may be horizontally oriented, expands. This window displays information about the song, which may include the name of the song that is currently playing, the name of the band performing the song, the title of the song's CD, and the CD cover art. Other information may be presented in alternative embodiments.

Additionally, the user may be presented with a rating system that allows the user to provide feedback to the application indicating how much he or she liked or disliked the song so that similar songs can be recommended or avoided in future playlists. The rating system can comprise a multiple-star rating system, or some other form of rating system (e.g., numeric, alphanumeric, etc.). The user also may be presented with the icons of online music sales affiliates that will allow the user to click-to-purchase either the song's physical CD or the online download of the song or the entire CD.

In yet another embodiment, if the user clicks on the CD cover art, a logic cloud dubbed or referred to as a "song cloud", will expand to show the current song's CD cover art in the center of the user's desktop. CD cover art from similar artists' will radiate outward in descending size providing a visual representation of how closely the songs are related. The selection and positioning of CD cover art is based upon a selection algorithm in the invention. It should be noted that the "song cloud" feature can be used with representations of artists, songs, or genres, in addition to or in place of CD cover art.

DETAILED DESCRIPTION OF EXEMPLARY EMBODIMENTS

In one embodiment, the present invention comprises a stand-alone desktop application (i.e., client) that resides on an end user's local computer and receives customized music playlists and content via the Internet from a network of distributed servers. The end user may install the application in a variety of ways, including, but not limited to, downloading it from the Internet or installing it from a CD that has been pre-loaded with the client.

Figure 1:
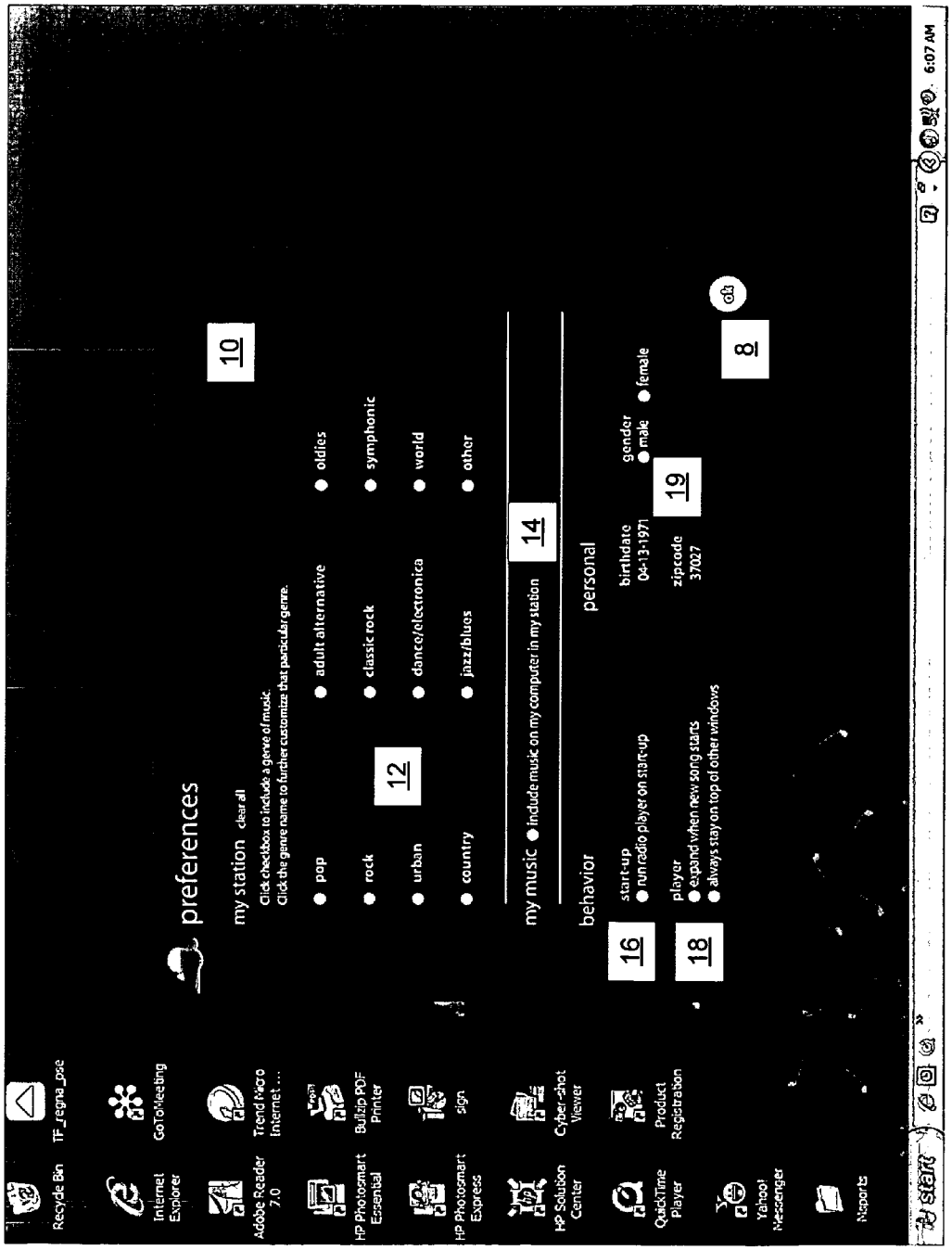
FIG. 1 shows a preference screen of a system in accordance with an exemplary embodiment of the present invention.

FIG. 1 shows an exemplary preferences screen 10. In the embodiment shown, the preferences screen allows fast (or "30 second") customization of the performance of the application by the end user. The user is asked to indicate his or her musical preferences by clicking on the checkbox beside one or more musical genres 12. The preferences screen is shown to the user during the installation process, but also may be accessed by the user later.

Figure 2:
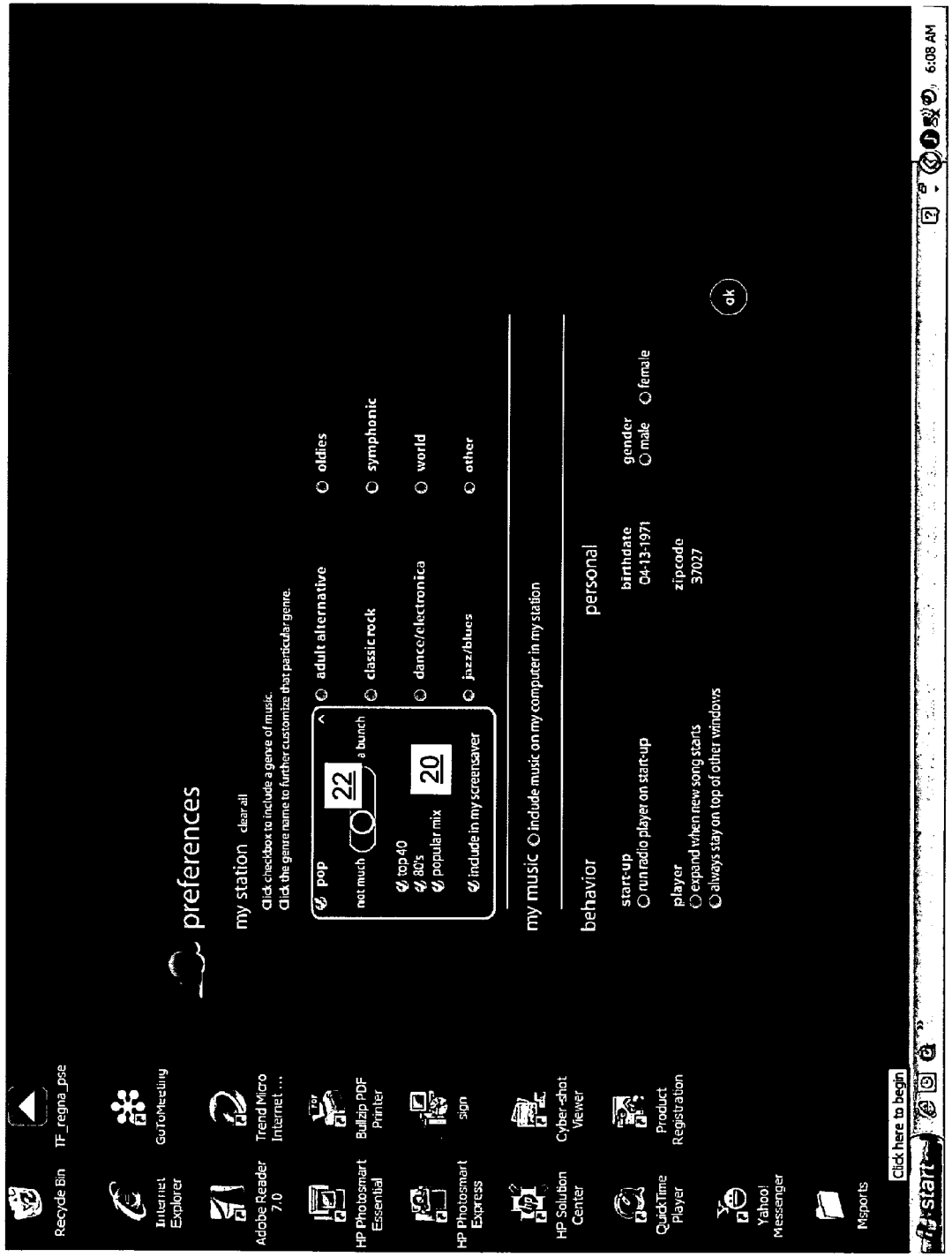
FIG. 2 shows a popup window with a preference slider of a system in accordance with an exemplary embodiment of the present invention.

If the user chooses, he or she may opt for greater music customization by clicking on the genre name in the preferences screen to reveal a drop down menu 20 as shown in FIG. 2. This menu then allows the user to move a slide bar control 22 to indicate how much music within that genre they would like to receive and further allows them to opt in or out of subgenres within that musical format. Three subgenres are shown in FIG. 2, but the number of subgenres can be greater or fewer. In other embodiments, alternatives means of indicating how much music within a genre may be used, such as entry of a specific percentage, clicking of checkboxes, or the like.

Figure 3:
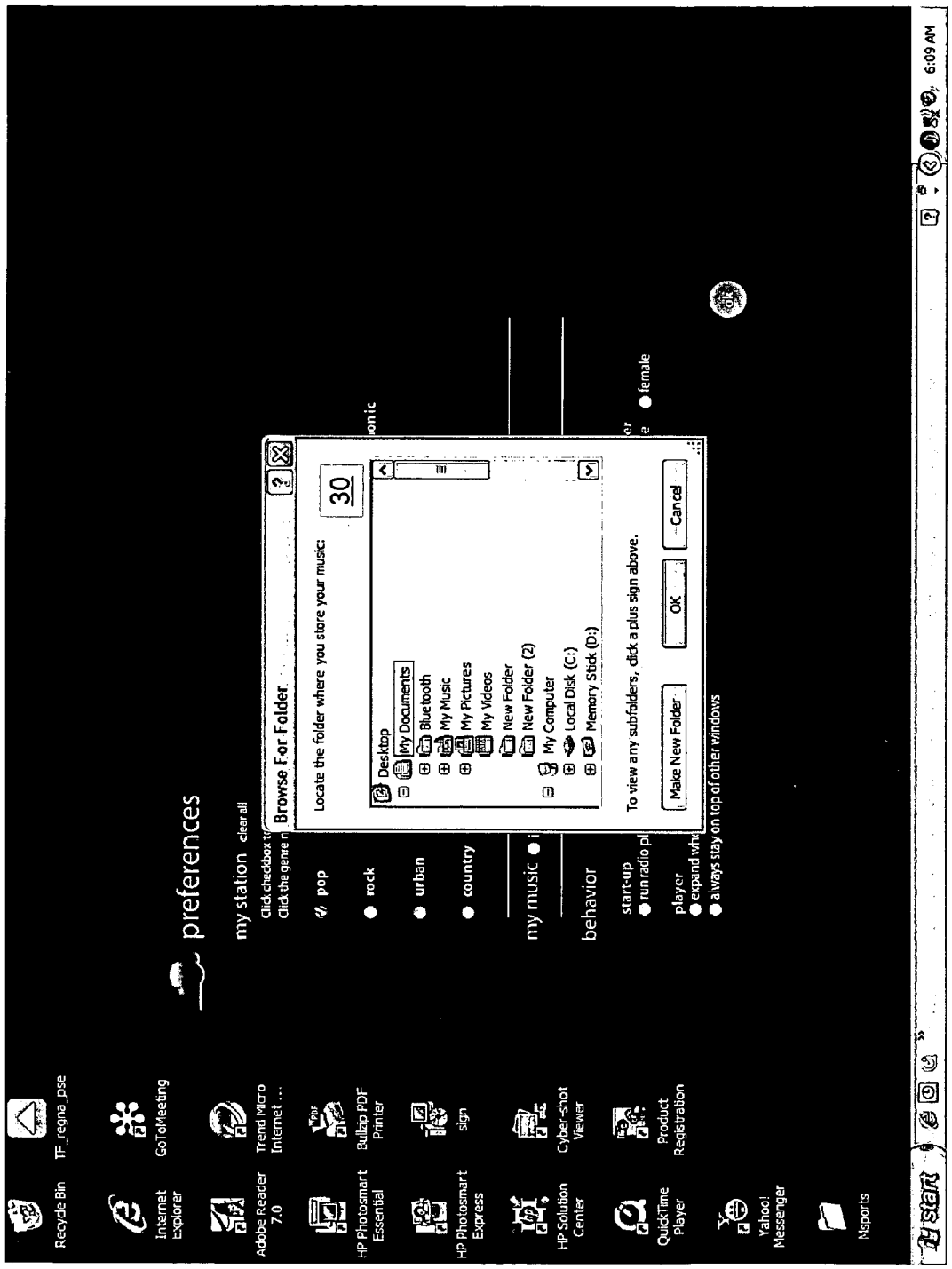
FIG. 3 shows a "My Music" popup window of a system in accordance with an exemplary embodiment of the present invention.

The preferences screen also offers an option 14 for the user to include his or her music from their local drive in the music mix. In FIG. 1, this is presented as a "My Music" button 14 that the user can click, although other ways of presenting this option to the user are possible. Activating the option opens a separate window and prompts the user to indicate the locations on their local drive where their music (such as, but not limited to, an MP3 collection or iTunes catalog) is stored. As shown in FIG. 3, this prompt can appear as a browsing window 30. In another exemplary embodiment, a search for such locations can be performed to identify music files on the local drive, and these locations presented as options to the user. Alternatively, the user also may be given an option (such as one or more checkboxes) to indicate if they want their iTunes catalog (or other standard or known music sources) included.

Once the appropriate folder or folders are located, or appropriate selections are made, the user clicks the "OK" button and the application scans that user's digital music files. This process in the present invention possesses two distinct advantages over the prior art. First, the invention scans the user's music files and becomes exponentially more intuitive to the user's musical tastes when choosing what songs the user is likely to want to hear from the player. Two, it allows the application to seamlessly integrate the experience of both discovering new music provided by the Internet radio service and listening to music within the user's music directory all within a single player environment.

The preferences screen also provides the user the ability to indicate preferences for how the player behaves, including, but not limited to, such functionality as whether the player should run whenever the computer is started 16, whether the player should always expand whenever a new song is played, whether the player should remain on top of all other windows 18, and the like. The user also is asked to register certain personal data 19, such as, but not limited to, their age, gender and zip code. Clicking the "OK" button 8 saves the current preferences and closes the preferences screen (if the screen was reached as part of the installation process, then application then automatically completes the installation process). In an exemplary embodiment, if the preferences screen is accessed after installation, the user may be presented with the option of exiting this screen without saving any of the changes.

Figure 4:
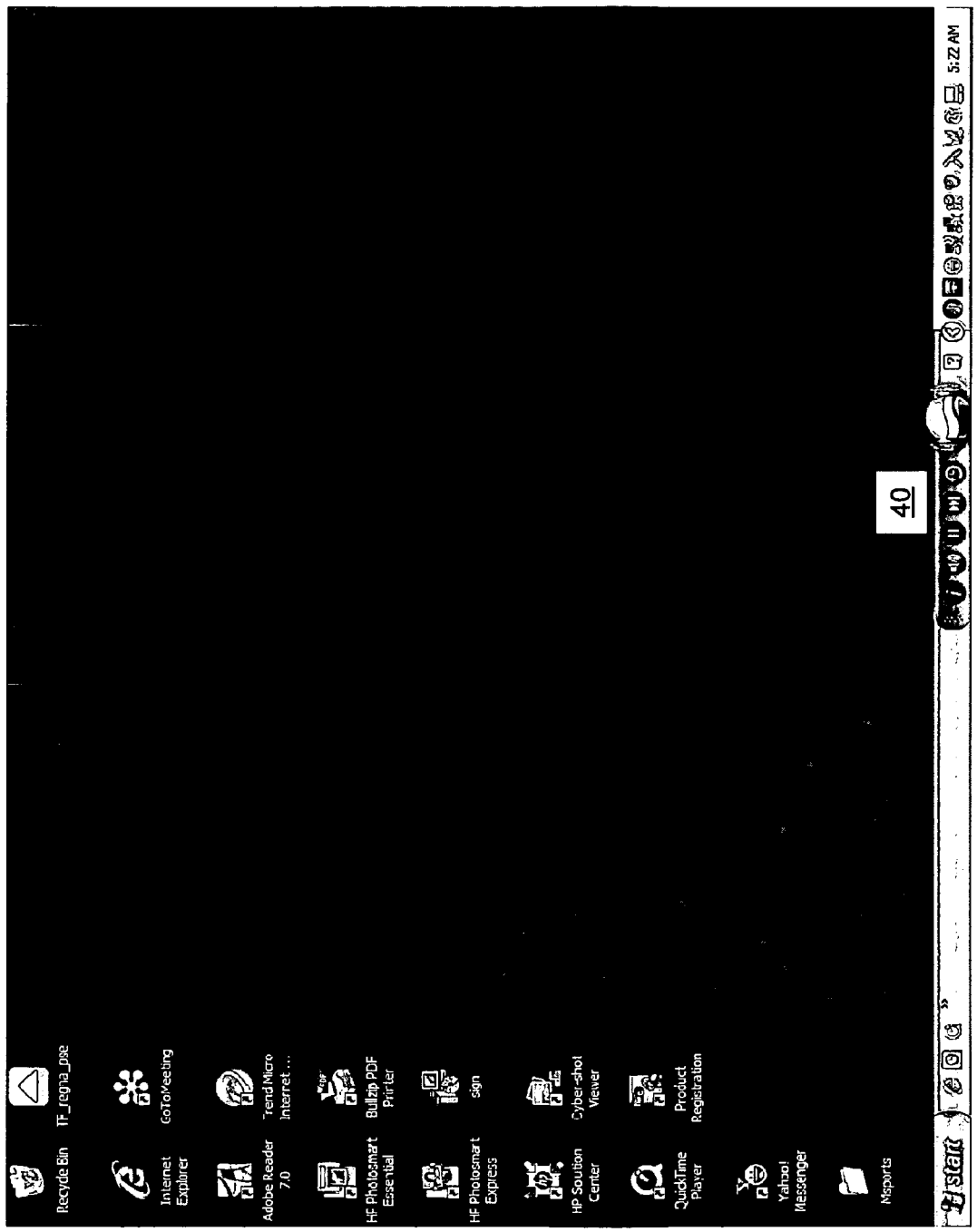
FIG. 4 shows a screen-shot of a computer desktop with player icon in the tray in accordance with an exemplary embodiment of the present invention.

The application, once installed, can be activated or launched on the user's computer in a number of ways, including, but not limited to, clicking on an icon located on the desktop or within their task bar. In one exemplary embodiment, when the application is launched a small player or icon 40 appears unobtrusively docked in the user's task bar, as seen in FIG. 4. The player can be moved around the screen to suit the user's preference but, unless moved, the player will remain stationary in the task bar and therefore will not interfere with the user's active desktop area.

Figure 5:
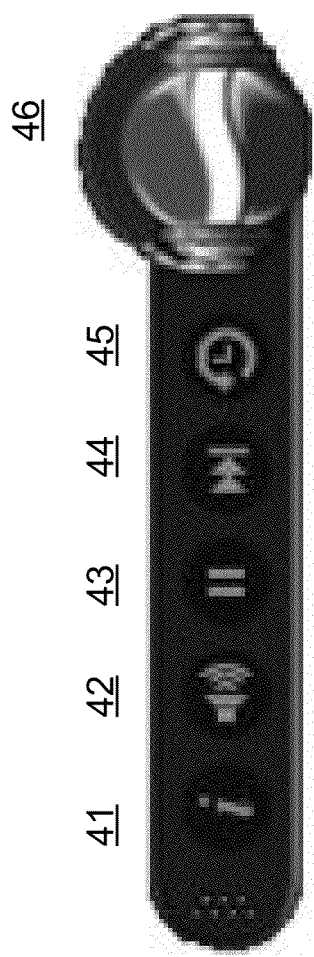
FIG. 5 shows a screen-shot of a streamlined player in accordance with an exemplary embodiment of the present invention.

The appearance of the player in streamlined form may comprise several function buttons 41-45 and a prominent sponsor logo 46. In the exemplary embodiment shown in FIG. 5, function buttons from left to right include, but are not limited to, an information icon 41, sound volume control 42, pause/play 43, a skip feature 44, and a clock icon 45. When the user rolls his or her cursor over the information icon a small window 48, which may be horizontally oriented, expands. This window displays information about the song, which may include the name of the song that is currently playing, the name of the band performing the song, the title of the song's CD, and the CD cover art. Other information may be presented in alternative embodiments.

Figure 6:
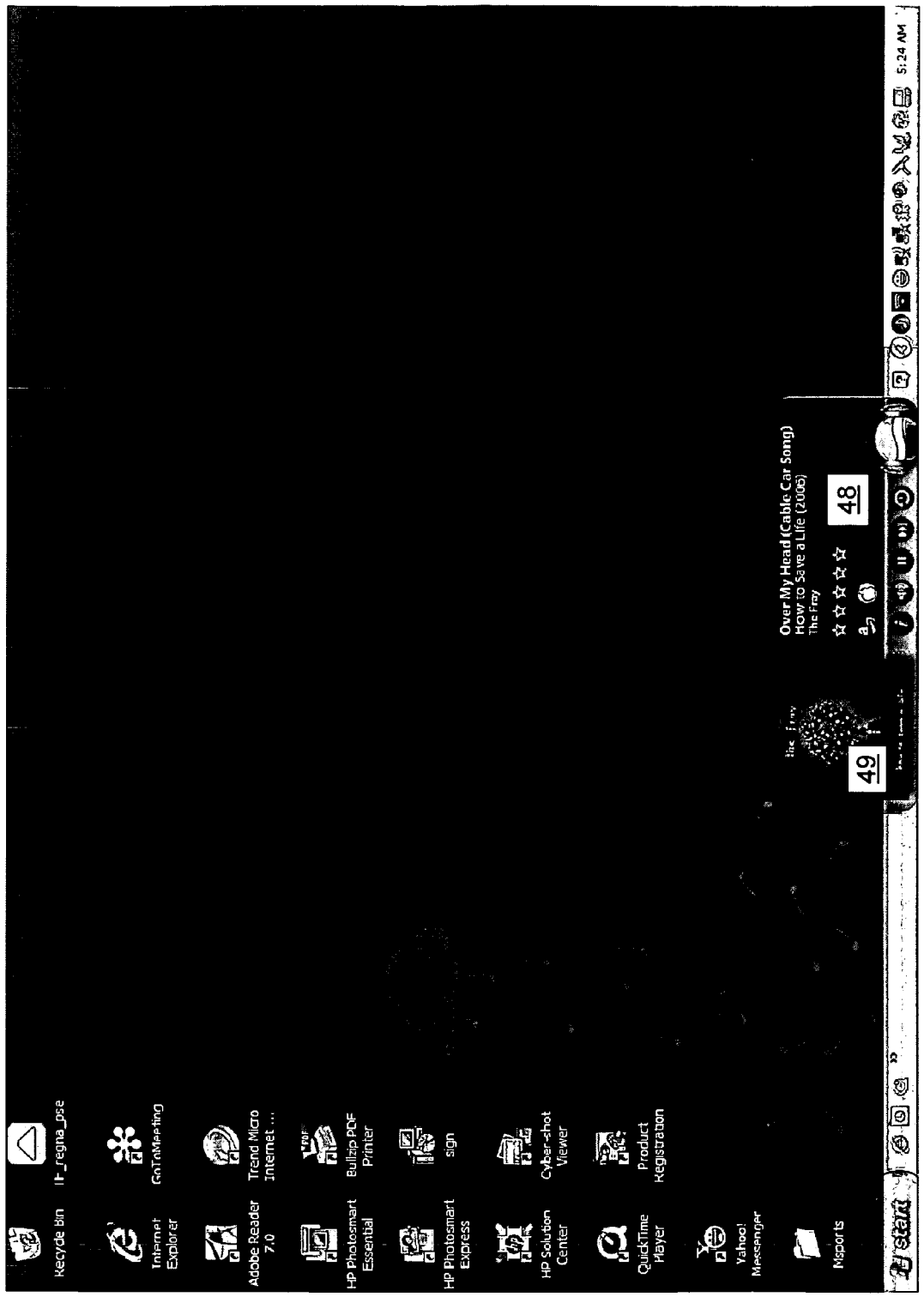
FIG. 6 shows an informational window in accordance with an exemplary embodiment of the present invention.

Additionally, the user may be presented with a rating system that allows the user to provide feedback to the application indicating how much he or she liked or disliked the song so that similar songs can be recommended or avoided in future playlists. The rating system can comprise a multiple-star rating system, or some other form of rating system (e.g., numeric, alphanumeric, etc.). The user also may be presented with the icons of online music sales affiliates that will allow the user to click-to-purchase either the song's physical CD or the online download of the song or the entire CD, as seen in FIG. 6.

Figure 7:
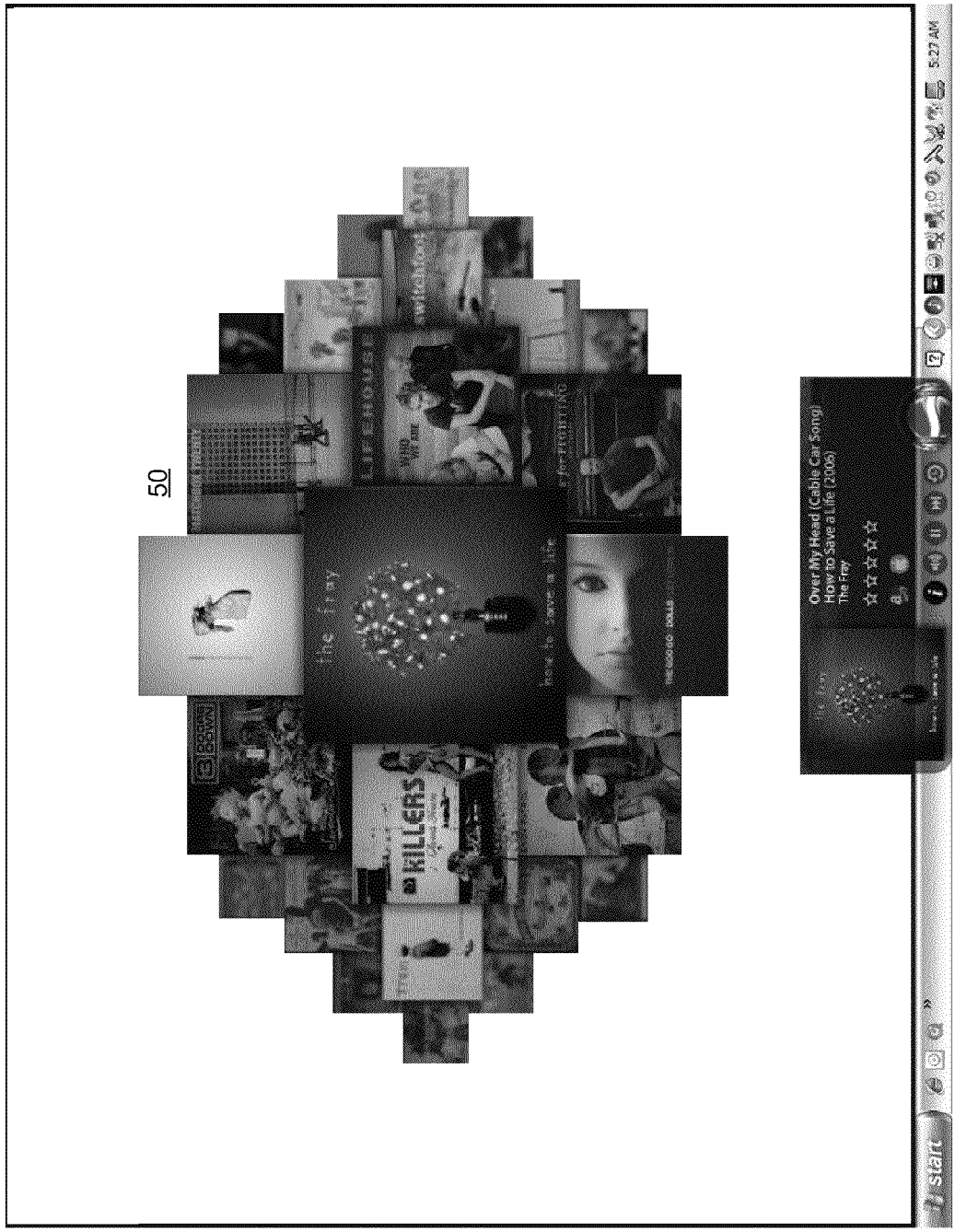
FIG. 7 shows a "song cloud" in accordance with an exemplary embodiment of the present invention.

In yet another embodiment, if the user clicks on the CD cover art 49, a logic cloud dubbed or referred to as a "song cloud" 50, will expand to show the current song's CD cover art in the center of the user's desktop, as seen in FIG. 7. CD cover art from similar artists' will radiate outward in descending size providing a visual representation of how closely the songs are related. The selection and positioning of CD cover art is based upon a selection algorithm in the invention. It should be noted that the "song cloud" feature can be used with representations of artists, songs, or genres, in addition to or in place of CD cover art.

The "song cloud" feature can then be closed by clicking on an album's CD cover art (i.e., an album in the "song cloud"). The "song cloud" feature will close and return to the small horizontal window in which the current song's CD cover art first appeared, and begin to play a new song from the chosen album. If the user then moves his or her cursor out of the horizontally oriented window the player automatically contracts to its original streamlined appearance.

Figure 8:
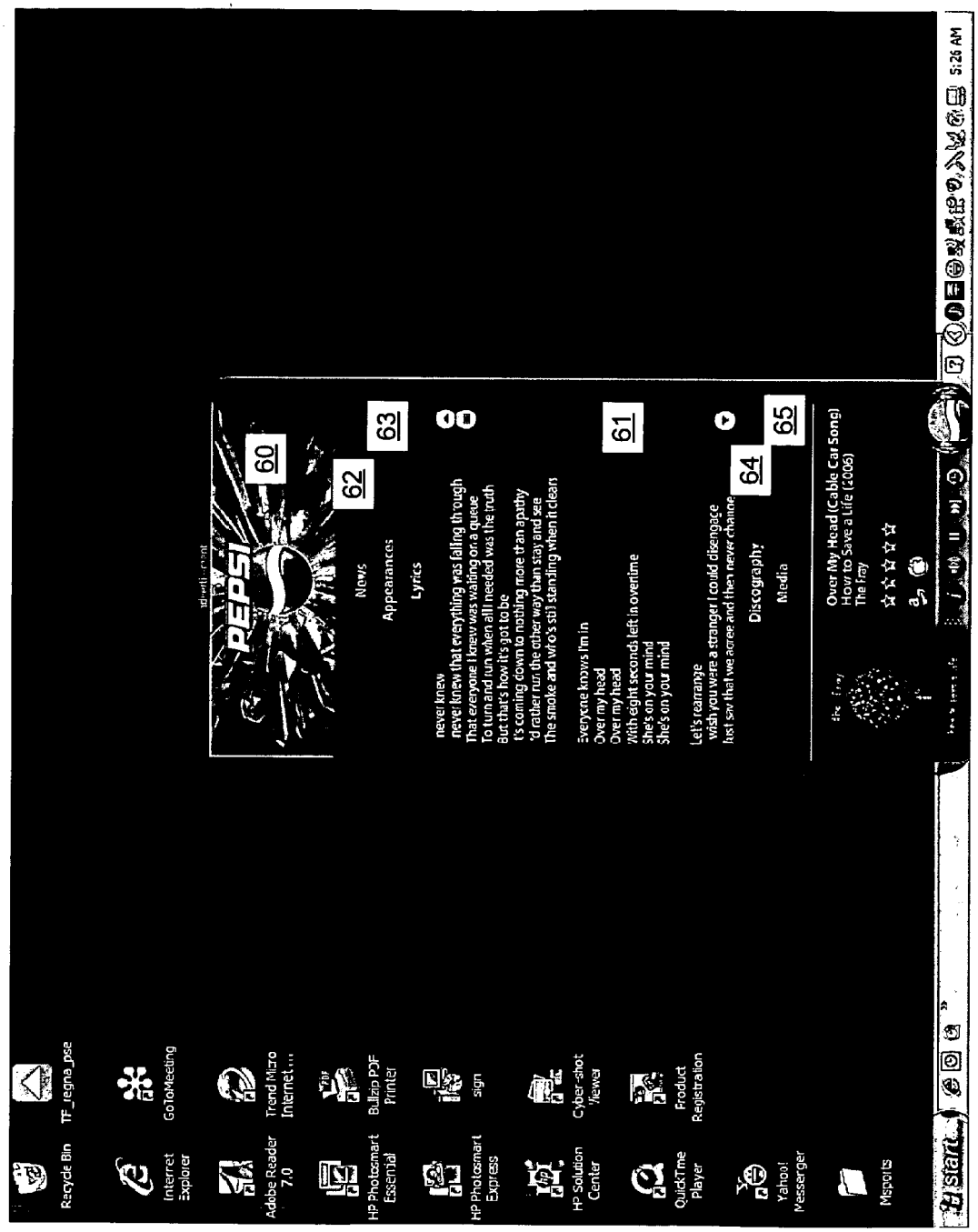
FIG. 8 shows a lyrics window in accordance with an exemplary embodiment of the present invention.

Should the user still require more information about the current song, he or she can physically click on the player's information icon 41 and a new window appears. As seen in FIG. 8, this window may be vertically oriented. This new window expands to display a prominent masthead 60 for sponsor or other advertiser messages as well as multiple information tabs.

In one exemplary embodiment, information tabs included within the vertically oriented window include, but are not limited to, the following five areas (which need not be in this order): (1) a lyrics tab displays the current song's lyrics 61; (2) a news tab 62 displays aggregated news regarding the song's band or artist; (3) an appearances tab 63 displays the current band or artist as well as similar artists' nearest tour dates and locations to the user's registered zip code and allows the user to click-to-purchase tickets and band merchandise online; (4) a discography tab 64 allows the user to view other CDs by the current song's band and the ability to use the player's rating system (which may comprise multiple star ratings) to rate each of these CDs as well as click-to-purchase the physical CD or the music download; and (5) a media tab 65 allows the user to consume multiple forms of digital media used to promote the band including, but not limited to, wallpapers, buddy icons, avatars, photo galleries, podcasts, music videos, etc. If the user then moves his or her cursor out of the vertically oriented window the player automatically contracts to its original streamlined appearance.

Figure 9:
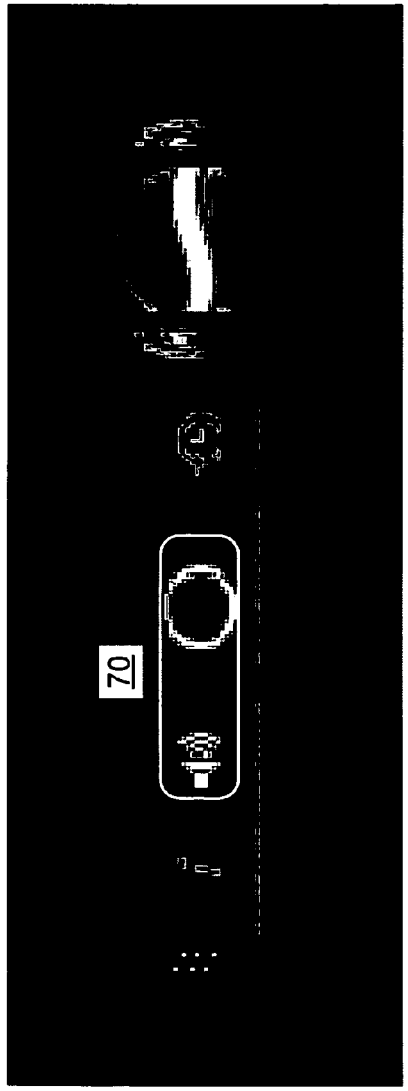
FIG. 9 shows a screen-shot of a streamlined player in accordance with an exemplary embodiment of the present invention.

In the embodiment of the streamlined player shown above, the second button from the left is the sound volume control 42. Once clicked, the volume button displays a slide bar control 70 that allows the user to increase or decrease the player's volume, as seen in FIG. 9. When the desired volume is selected the user simply clicks and the slide bar control disappears and returns the player to its original streamlined appearance.

Figure 10:
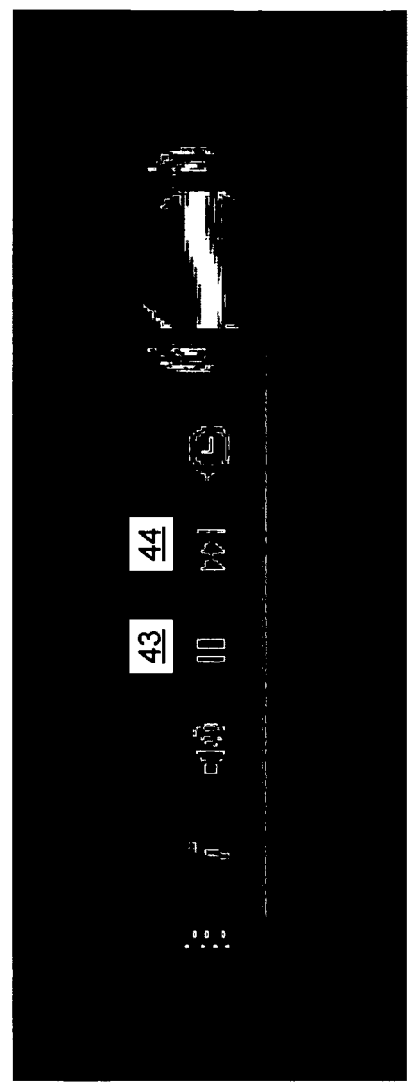
FIG. 10 shows a screen-shot of a streamlined player in accordance with an exemplary embodiment of the present invention.

As shown in FIG. 10, the third function button from the left in this embodiment is the pause/play feature 43. This button allows the user to alternately pause and restart the player at will. The fourth function button is the skip function 44. This button allows the user to "skip", or advance, to the next song in the playlist. In an exemplary embodiment, this action of skipping a song will then cause the system to negatively weight both the song and the artist, and thereby reduce the likelihood of the user hearing either again. The number of times that a user can skip the current song within the player can be limited. In one exemplary embodiment, this limit will be determined by industry statutory licensing.

Figure 11:
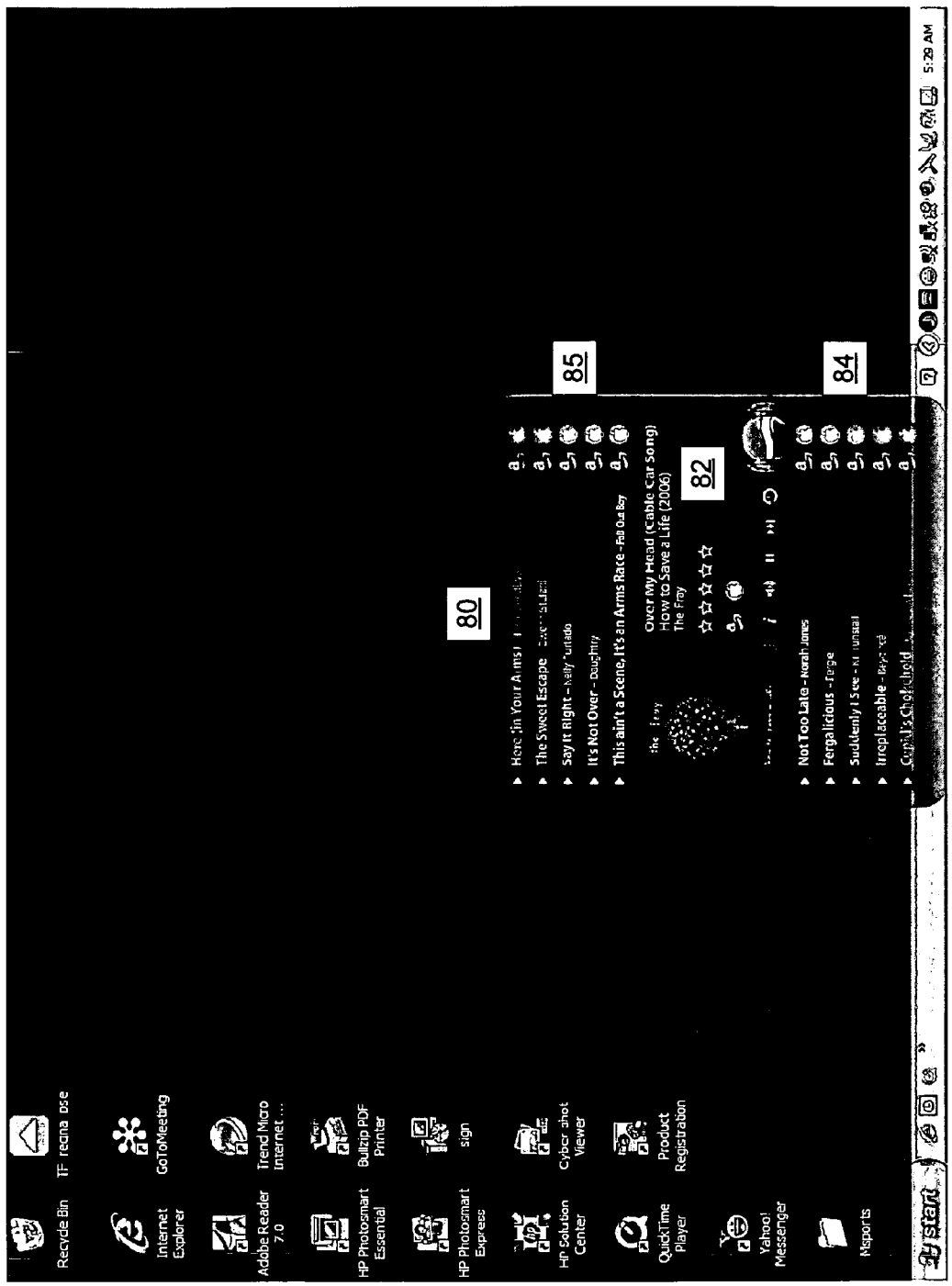
FIG. 11 shows a screen-shot of a "time machine" window in accordance with an exemplary embodiment of the present invention.

In this embodiment, the fifth function button from the left is the clock icon 45, also known as the "time machine" feature. As seen in FIG. 11, when the clock icon is clicked another window 80 appears (in this embodiment, the window is, but need not be, vertically oriented). In the center of the new window is the small information window 82 that appears when the user rolls his or her cursor over the information icon at the far left end of the player. As stated above, this window displays information about the song, such as the name of the song that is currently playing, the name of the artist, the CD's title, CD cover art, the multiple-star rating system and the icons of online music sales affiliates that allow the user to click-to-purchase either the song's physical CD or the online download of the song or the entire CD.

However, in addition to the current song's information, the "time machine" feature displays a list 84 the past several songs played shown beneath the current song's information in descending order from most recent to most distant. Similarly, the time machine feature displays a list of 86e upcoming several songs that will be played shown above the current song's information in ascending order from next to most distant. In visually displaying both future and past songs in the player's queue the user can skip ahead more than one song at a time or choose to re-listen to a song in the recent past. The queue display can be shown in the opposite direction in alternative embodiments.

The number of songs displayed for both past and future can be limited where needed. Since industry standards limit advance notification of an Internet radio station's future playlist, the number of songs displayed for both the past and the present will be limited by these standards, and can be randomly shuffled when a new song is chosen if required. Therefore, in this embodiment, once the current song finishes playing it will move down to the first spot in the previously played list and the last song displayed in this list will vanish. Likewise, the next song in the upcoming playlist will drop down into the currently playing position along with all requisite information shown in this window. As a result, the most distant song in the play list will drop down one position and will be replaced by a new song at the top of the playlist's queue. Again, if the user then moves his or her cursor out of the time machine's vertically oriented window the player automatically contracts to its original streamlined appearance.

Figure 12:
FIG. 12 shows a screen-shot of a screen-saver in accordance with an exemplary embodiment of the present invention.

In yet another embodiment, the system comprises a dynamic screen saver component, as shown in FIG. 12. This feature continuously updates the user's screen saver with high resolution, full screen photography and music news regarding the genres and subgenres the user selected in their preferences during installation. When launched, the dynamic screen saver may also display a sponsor logo 90 the lower left hand corner as well as a "now playing" feature 92 the lower right hand corner that displays the current song's title, CD and artist name and the CD cover art, or similar information. If the user clicks on a music news headline, a new window will open within the dynamic screen saver and display the article and the online music sales affiliates where the reader can purchase any music mentioned within or relevant to the article.

As described above, the user may install the client application by any standard means, including but not limited to, download or CD. Regardless of method, the application is self-contained and the user is downloading the actual program and not an installer. This can be accomplished because the application itself is so small and it does not have to modify the registry. The application does not require that the user has any administrative rights other than control over his or her screen saver. Since the install itself is so small, everything is built into the player up front. This provides the benefit that anytime the application starts up it can see if it has something that it needs and it can update itself, and the end user will not be aware of this process.

In one exemplary embodiment, the end user is downloading the base application .exe file and the system has to balance how much it includes in the core and what to break out into separate modules. As a result, the system can update individual modules without having to install a new application. From a programming vantage this approach is more involved for the developer to manage and requires that he or she know which module to look for when performing updates. However, from the user's perspective this approach allows the application to perform more reliably and is much easier to update. In one embodiment, therefore, the application is separated into as many modules as possible so that updating the application and updating it frequently will be as easy and as seamless as possible.

Another benefit to separating the application into multiple modules is that many computers now have more than one processor, and separate modules each can execute as a separate thread simultaneously. Therefore, if the database is a separate module from the module that actually plays music, these then can be balanced between multiple processors thus reducing the possibility that processor load might make the music skip. Examples of modules in embodiments of the present invention include but are not limited to, the client database, user preferences, song cloud, time machine, the screen saver component and the player. Additionally, all information and the information expanded windows as well as the ability to display ads and sponsor logos can each be their own separate modules.

Figure 13:
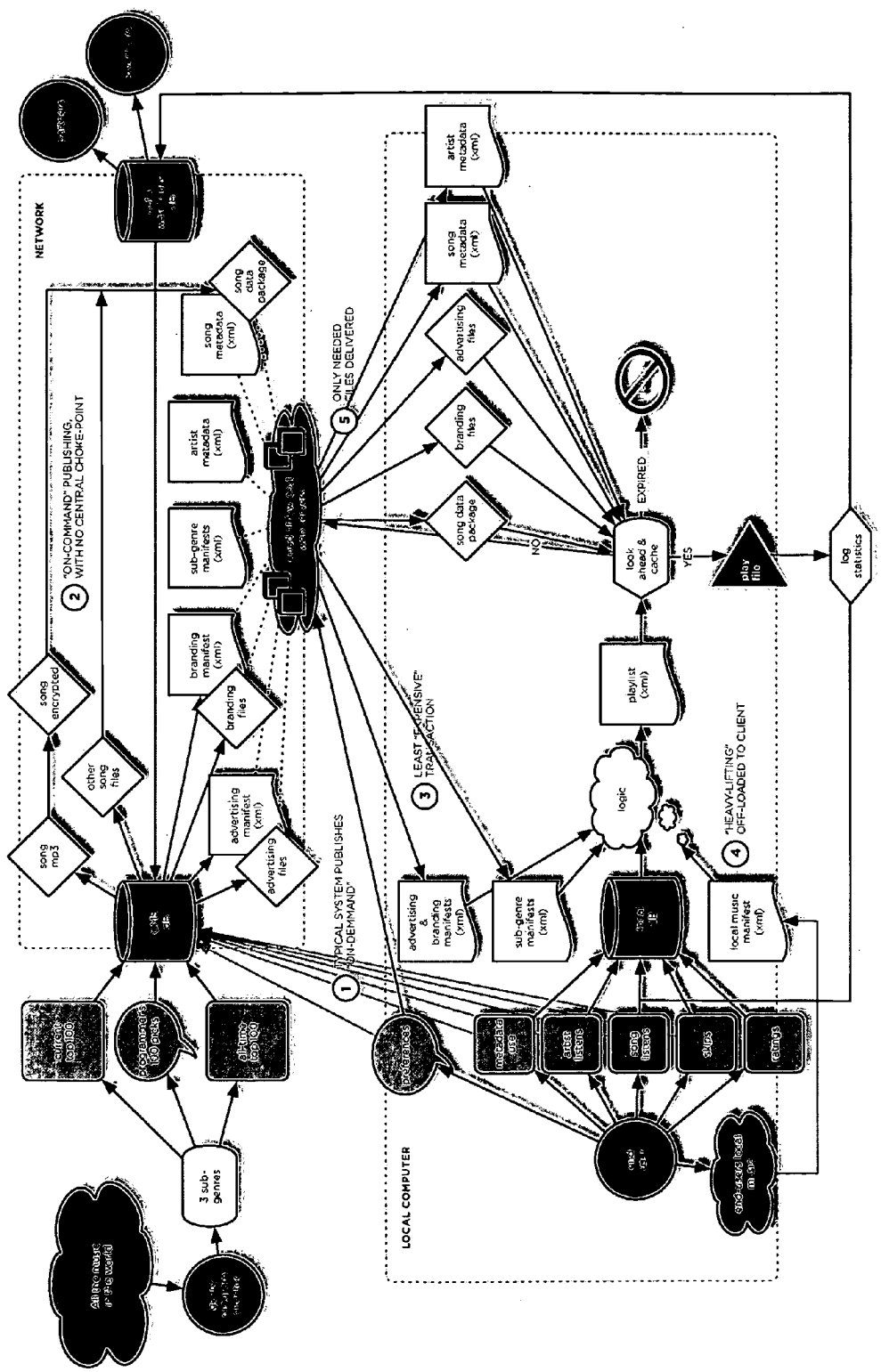
FIG. 13 shows a diagram of a system in accordance with an exemplary embodiment of the present invention.

The client application described above may be part of an Internet radio service, comprising a broader client/server network, as shown in FIG. 13. The delivery methodology is predicated on delivering progressive, static downloads, as opposed to streaming or serving content dynamically from a server. The reasoning is that the server is a central, finite resource that becomes proportionally more expensive as it scales to accommodate more users. Therefore, any action the system executes at the server level is a cost liability. On the client side, however, the application becomes bigger and faster the more people use it. As a result, the system described herein is scaling for free whenever it can offload anything to the client. In short, the present invention shifts where the heavy lifting or logic takes place from the server to the user's computer.

In one exemplary embodiment, included in the initial client installation is a list of servers where the base application knows to look in one central location (e.g., www.topcloud.fm) to get the "manifest" the first time. The "manifest"

is a text file formatted for XML (or some similar format) that contains the names of the different modules to load, and a list of all the redundant system servers. In order to create the manifest, the system will have an "editor" that works with both a content management system and a database. The editor simply creates or edits the content and, using the system's content management system, then saves the files to all the distributed servers. However, instead of costly database and streaming servers, a system in accordance with the present invention will literally use inexpensive web servers, and moreover spread these web hosting servers all over the world.

In an exemplary embodiment, a user can run the installer and get the manifest for the first time, with the system providing a relative path whenever it tells the application to look for files. This is to say that the system will not direct the application to one specific web server address. Instead, the system will provide multiple web server addresses and then every time the system goes to download new content to the user (for example, the latest Dirks Bentley song), the application will randomly pull from an array of cheap web servers that are all redundantly populated with the same song files. This embodiment is a simple and inexpensive fail over system and balances the load by virtue of randomness. This will ensure work load balancing across all servers and that bandwidth is not overloaded on any one particular server. In the event that one of the web hosting accounts is approaching its bandwidth limit, that server simply can be removed from the manifest so that the system does not incur any artificially inflated bandwidth charges. In its place, the system can temporarily or permanently set up a new account on the fly, and then include the new server address into the manifest. Within minutes the entire universe of system users will have access to the new server.

In the majority of web applications, content does not change simply because the end-user requests it. Even with a service as comprehensive as Amazon.com, 99% of the delivered content does not change simply because a particular end-user requested it, conversely the information only changed when someone at Amazon changed the product information itself. But because Amazon must serve that change to 20 million people through a web browser, which does not provide local data persistence, they must do so through an expensive system of application and database servers. That cost inefficiency is avoided by the present invention, which has local data persistence because it is its own application outside the web browser. As a result, the system can make use of all the users' personal computers' processors and hard drives that the end-users are, in effect, offering freely.

In one embodiment, during installation, the user provides their registration data and the system logs that data into a local database located on each end-user's computer. The database can be, but need not be, a mSQL database (mSQL is an open source, smaller version of MySQL that is a lightweight database engine designed to provide fast access to stored data with low memory requirements). Since the system logs the user's registration data on their hard drive (in mSQL or other form), the data can be transferred back to the system's network of servers whenever it is convenient. The system can have the local database report to its servers periodically so it can serve the appropriate ads and sponsor messages to its users. However, since receiving this information from the user is not critical to the application's functioning it does not matter how long this process takes (i.e., a few milliseconds or a few seconds). This time difference, in contrast, can be unacceptable if a user is waiting on an application.

During registration (or by later modification of their preferences), the user has the "My Music" option of pointing the client application at a local folder or folders containing their digital music collection. This often will be a folder with a nested hierarchy of folder after folder that the system will loop through and find all of the files that the application knows how to understand. Examples of such files include, but are not limited to, MP3 files, WMA or wave files, and even iTunes protected AAC files. Even though the iTunes songs are encrypted the metadata about the song is not encrypted. Therefore, the system will know the artist, the song title, the CD and the genre and all the other relevant "DNA" about the song.

Since the system can access all this information about the end-user's personal music collection, it will know a tremendous amount of information about what the end-user likes. This information, coupled with the genres and subgenres that the user identified during registration or afterwards (by modifying his or her preferences), along with each action within the player, will be weighted into an algorithm that will allow the system to infer what music to place in the user's playlist.

This function will allow the system to predict a user's musical preferences with greater accuracy than current "smart" personalized Internet radio stations can accomplish after months of user interaction. Additionally, because the system incorporates the user's songs into the service's playlist, the business can save 10%-40% or more in performance royalties because the system does not have to pay performance royalties for the music that is already owned by the listener.

Comparatively speaking, the system of the present invention possesses an advantage over competing Internet radio services in that at the point a listener first starts using the system, the user of the present invention already has indicated his or her genre and subgenre preferences during registrations, and the invention already has scanned all of their music on their local hard drive. The present system thus has the competitive advantage of immediately and comprehensively understanding the type of music the user will like. This is in sharp contrast to prior art services, which require extensive interaction in order to deliver a playlist customized to the user's preferences. The traditional way for a customized Internet radio service to provide a playlist would be for the user to make a request from a database and the database then sends back a song or a list of songs. However, the system of the present invention avoids this process in order to limit the amount of costly database resources required.

In one exemplary embodiment, a music editor or editors selects songs to be included in each subgenre. When the music editor chooses the songs (which can number in the hundreds or thousands) for each subgenre, they will load everything about those songs into the database through the content management system. However, in doing so, the editor not only uploaded the song file as an MP3 but he or she also loaded other binary files like the CD cover art, videos, pictures, and the like, and then entered in accompanying text metadata (data about data) like the artist name, their songs, their albums, the year of an album, a news article, etc. The more that can be described as text, the better. Additionally, included within that text is also where to find the song's files. The editor then enters all this metadata into the content management system where it is deposited into the database and cached permanently.

Instead of leaving that data and metadata in the database, however, the system places both the data (e.g., songs, videos, CD art) and the metadata (e.g., text about the song) onto the system's array of cheap web servers until each server has the exact same content. The system then creates a manifest for each sub genre that allows access to this data. One of the objectives of the present invention is to never deliver content unless absolutely necessary. Because even though the system is already saving money by utilizing redundant, inexpensive web servers, it can save even more by not having to incur the bandwidth charges for something the user doesn't want. Equally important, the application behaves in this manner so the user's computer is not cluttered with data they have not requested.

The system therefore finds a balance between delivering the user enough data to acquire the next several songs so the application can remain ahead of the listening experience, but without delivering so much that the application becomes inefficient. Delivering enough metadata in the form of text is a good compromise because text is cheap. Even if the system delivers a manifest about all the metadata for all (for example, 300) songs in a particular subgenre, the file size should not exceed several kilobytes.

Academically speaking, a programmer would balk at delivering an XML file that has hundreds of songs that the user may never listen to. Theoretically, it would be more efficient to have the server just deliver the metadata about the one song they are going to listen to. But this is one of the instances where the academic world and the practical world diverge. Text is so cheap that the cost is far less to deliver the metadata about 300 songs to the end user and let his or her computer figure out which song they want to listen to, than it would be to have a network database server choose that same song.

Text is cheap and the system does not have to be terribly efficient with the XML (or similar format). Instead, the system is efficient about delivering the more bandwidth and server intensive content. The system can deliver the metadata about all songs in the subgenre, but it will not actually deliver the song until the application knows that the song is going to be picked because the song delivery is exponentially more expensive. Instead of, for example, 2 KB in data, the song would be 3 MB, so if the system can defer offloading that until later, it will.

In another exemplary embodiment, the system can store multiple versions of the songs encoded at different bit rates. This allows the system to offer a higher quality version to subscribers (or a certain level of subscriber). Furthermore, in the event of network congestion, the system can deliver a lower quality version faster in the event it does not have something cached. This is far less expensive than trying to scale bitrates on the fly.

Once the user has all the manifests for their subgenres, and the system scans and understands the user's local music collection, the application now has enough for the "brain" on the local user's computer to pick a song. The database on the local user's computer will do so in a two part process. The first part will apply the algorithm and weight what it knows about the listener's preferences, and the second part will make a random pick from the universe of music that meets the user's weighted criteria. However, the more the user interacts with the player and the music that it recommends, the less and less random these picks will become.

In one embodiment, there are two types of weighting criteria. First, absolute weighting will be the points assessed or deducted according to the importance of each action taken by the user (e.g., skipping an artist might be worth −2 points). The second type of rating is cumulative weighting which will be based on absolutes like skipping an artist, but will increase or decrease in value based on how many times the user skips that artist (e.g., skipping an artist 3 times might be worth −8 points).

The system database on the user's local computer will then look at the metadata of all the songs in its chosen subgenres and create its own manifest for requesting songs from the servers (up until now the local client has only been the recipient of manifests). As a result, the system now has a playlist and the name of the first song that the player is going to request. The weighting process by which the playlist is chosen is then visually represented within the song cloud feature described above. This information cloud can be used by the listener to visually discern in a non-linear fashion how similar a current song is to other recently played music.

When the local computer asks for a song to play, the first thing that it does is look to see if the song is cached locally on the user's hard drive. If the answer is yes, the system saves money in two ways. One, it does not have to consume bandwidth to download the song, and two, it does not have to pay a royalty fee if the user already owns the rights to that song.

If the chosen song is not cached locally then the system has to request it from its network of web servers. However, the application does not look in a database server to locate the song because it already has the metadata that tells the local application where a relative path is to the stored song and the next several (e.g., 5) songs. The local computer then picks an absolute path at random and begins downloading all the information about the song, like CD art, news stories, appearances, videos, lyrics, etc. and Even though each one of those items is about the same song the local computer might have chosen a different absolute path to download each separate piece of data simultaneously from the various load balanced servers. When the user's local computer has downloaded all the content or, more importantly has downloaded just enough of the song, the song can begin to play. A benefit of this packet based HTTP delivery mechanism is that the music never skips or halts due to the delays in re-buffering a stream.

In order to remove songs and related content from the user's hard drive in a timely fashion, the system will execute housekeeping loop processes that will continuously delete outdated material. These loops will self-execute as often as every time a song finishes playing, although the frequency may be more or less. As a song drops down into the top of the previously played queue, the loop process will know to remove the song at the bottom of the list.

Throughout the experience, the system is receiving reports from the local client regarding its behavior. The advantage to this is that a sponsor or an advertiser can run a usage query in the middle of the day because the usage behavior is not driving the application. As a result, the system will not have to run a query overnight because the application is not dependent on usage data. The worst case scenario is that the data at any given second is not up to date at that moment.

The true cost savings is in the difference between streaming six hours of music versus the delivery method of the present invention which provides that same six hours of music. First, the present invention saves money because it does not require a bank of expensive database servers to choose the song playlist for each listener. Second, it uses a percentage of music cached on the user's hard drive which requires no bandwidth and no performance royalties. Third, the system attempts to cache a downloaded song in a protected format on the user's hard drive so it will not have to download it again. Fourth, the system will not be streaming the songs, which requires specialized and hence more expensive, servers.

In one embodiment, the system delivers content using the HTTP protocol over the standard port 80, which is a download, and has the added advantage that it can be progressive. Furthermore, delivering information in discrete chunks allows the player to skip forward and allows the time machine function, neither of which would be available in a streaming mode. Streaming Internet radio stations deliver content using RTSP (real time streaming protocol), or something even more proprietary. These streaming methods requires a specialized server and these stations can only handle as many concurrent connections as their streaming protocol license allows. They are also limited by the number of listeners that their streaming servers' processors support and the size of their bandwidth constraints. As a result, there are several variables tasking a streaming Internet radio station's resources in real time that require that they are built out for peak demand. The Internet, however, is designed to be a packet network—it is not designed to be a streaming network.

The same hardware that can handle 100 real time Internet radio streams could handle tens of thousands of HTTP requests. Massive scalability results, and the system does not require licensing an expensive protocol, is more likely to get through network congestion, and is more likely to not be blocked by a network provider that is trying to manage or shape traffic because the systems traffic appears as normal web traffic. As the music download is progressive, the user does not have to get the entire file to start playing. The advantage of the present system is that even a 3 MB song, for example, requires a transfer rate of a only few kilobytes per second.

The system of the present invention thus comprises a customized Internet radio service that delivers something different to one user than it does to another and the method for doing that without overloading the database and application servers.

The methodology and architecture of the present system can be applied to other areas. As discussed above, traditional web applications' application servers and databases publish dynamic content "on-demand" (i.e., when a client requests it). This is necessary because, in general, the remote application has no persistence on the local client. The vast majority of the "brains" of the application must be located on the server. This approach raises several challenges: (1) a client must have a constant network connection to access the application; (2) every new transaction requires a steep increase in central resource allocation (e.g, bandwidth, storage, processing); and (3) there is a central fail-point for all clients accessing the application.

An exemplary embodiment of the present system is able to deliver dynamic content with none of the above problems by using the "horsepower" of each client to run the application, and cached content locally (i.e., on the user computer or local network). The application and database servers are for administrative use. The results of such use are then made available to the clients as static files. This can be done through an inexpensive cloud of mirrored web servers. Cost is thus controlled, central fail-points are eliminated, and the client only needs a network connection when content needs to be updated. This works for many forms of content other than music.

Figure 14:
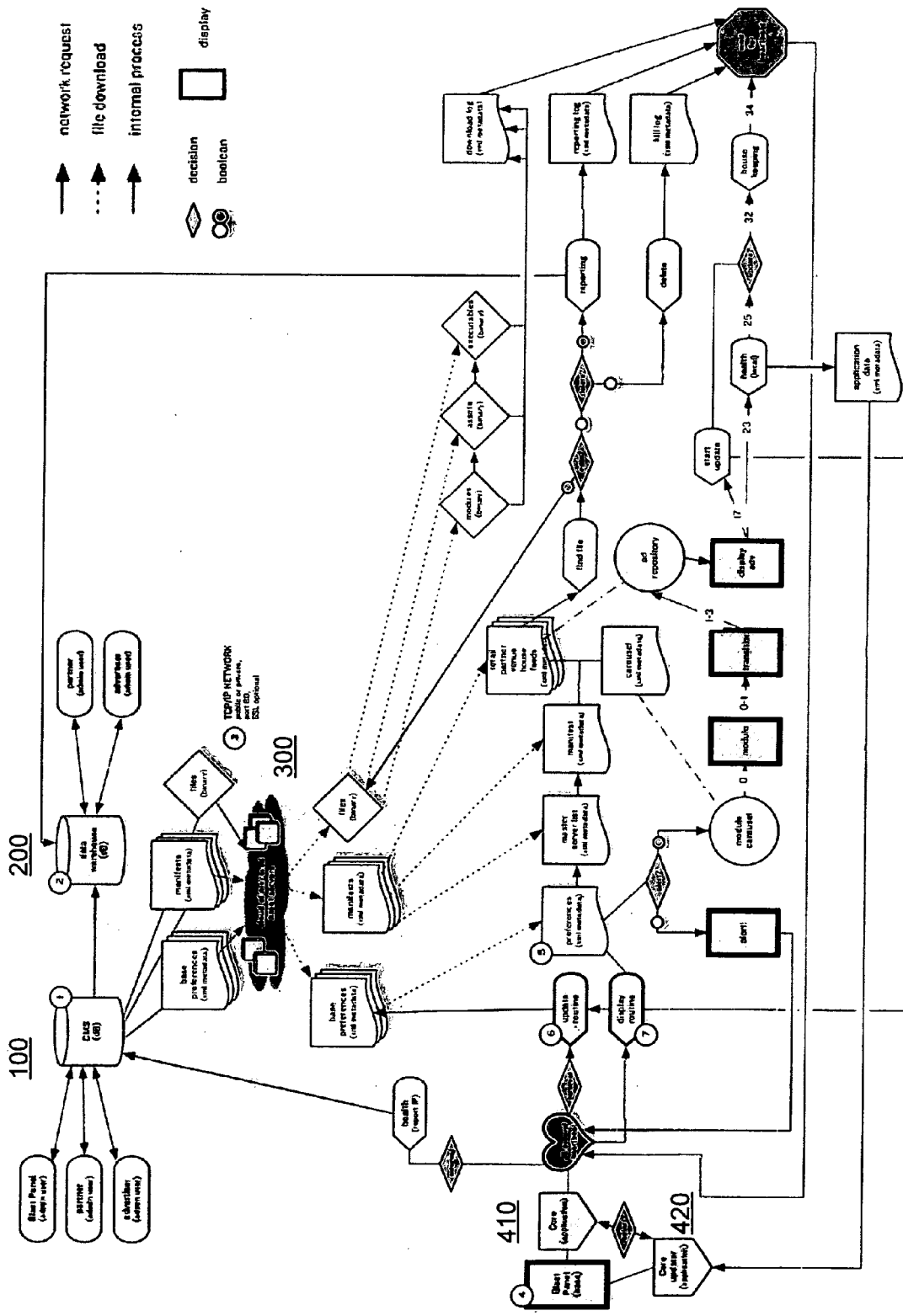
FIG. 14 show a diagram of a system in accordance with another exemplary embodiment of the present invention.

In one exemplary embodiment, as shown in FIG. 14, the server side of a network is divided into three distinct, task-based resources, all accessible via the Internet or other public or private network:

1. Content Management System (CMS) 100—This server needs only be powerful enough to support a given number of concurrent administrative users, not end clients. In one particular embodiment, this is a LAMP-powered Flex system custom designed.

2. Data Warehouse 200—This system stores and processes all tracking and performance data. Complex reports may be run against this data without impacting the performance of the CMS 100 or end clients.

3. Asset Servers 300—In this embodiment, a redundant array of "dumb" web servers all mirroring the same content. Each client transaction may make an HTTP request to any one of these servers, tracked and chosen according to proximity and capacity.

In this embodiment, the core requires at least intermittent access to an IP network. In one specific embodiment, the network should allow HTTP connections via port 80. The core is mostly "agnostic" in regards to the link, Internet, and transport layers of the network. TCP transport over an IPv4 network is one typical environment, but other environments may work as well.

This embodiment does not require the reservation of a specific amount of available bandwidth. When data is transferred, such transfers may be governed, throttled and shaped by the underlying network. Network appliances and strategies used to manage normal web traffic (e.g., caches, proxies, firewalls, etc.) may provide similar benefits and restrictions in managing a network in accordance with the present embodiment.

In addition, clients in the present embodiment are capable of consuming or using data outside of the core methodology described herein. These specific applications may require network configurations different than the typical operation of the core embodiment. For example, a Quicktime Streaming Server may be used to deliver a live video broadcast. This particular application would require that the underlying TCP/IP network supported those protocols and opened those to clients using the core embodiment described herein.

In one embodiment, a client (or "base") comprises two applications, an application core 410 and a core updater 420. The application core (e.g., eBlastPanel.app) controls most aspects of the base, including content display and network activity. The core updater (e.g., eCoreUpdater.app) monitors the base and is capable of restarting the application core or the entire base itself. In one specific embodiment, the base runs on a modified version of Macintosh OS 10.5.5 (a BSD Unix variant).

Each base understand "who" or "what" it is. Even if the local file structure is completely destroyed, if the base can connect to the network, it is capable of learning its identity and rebuilding itself based on a unique hardware identifier. This identity information may be used for fine-grained targeting of content delivery. For example, only content that has changed, is missing, and is appropriate for a given base may be requested.

In one embodiment, each base operates on the same 36 second "heartbeat." Instant alerts can be pushed to bases each heartbeat. Every certain number of heartbeats, a base may attempt to connect to the server to lock for new content through a cascading series of XML manifests (or the equivalent). Only content that is applicable to that particular base, is new, has changed, or is missing is downloaded and locally cached. Even the core application itself can be updated remotely.

Additionally, each base can individually control the speed of its update routine, and/or limit updates to a certain time of day. This background process may be closely managed to ensure that it does not impact the display performance of what is seen on the client screen.

Every base in an exemplary network can display different content (and advertising) based on a cascading targeting system. Information from the latest update is used to build an on-the-fly "carousel" of content that is filled from the most-targeted content to the least-targeted. Content can be displayed at a specific calendar time, or displayed in succession with each rotation of the carousel.

Each heartbeat, the core application decides the appropriate content (and advertising, if any) to display, as well as controlling the in-between transitions. Each screen of content may be an actual mini-application unto itself that can have its own built-in smarts beyond that of the core application. Content can be of almost any type imaginable, including full-screen, high definition video.

This client-server architecture and methodology thus utilizes client-side software to allow "push" publishing over a standard TCP/IP network. It capitalizes on the local processing and storage capabilities of the client to expand network power and control cost as the network grows. It works across the widest variety of heterogeneous network environments. And it deliver content (e.g., applications, video, advertising, and the like) via the least expensive form of transaction.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

We claim:

1. A system for distributing and playing music on a computer, comprising:
   a computer comprising a processing device and a memory storing an application; and
   a content delivery network comprising a content management system server, a data warehouse server, and an array of redundant asset servers mirroring the same content;
   wherein the application, when executed by the processing device, causes the processing device to:
   obtain and play music files, songs, or other content downloaded from the content delivery network and stored on a storage device in communication with said computer, wherein content is downloaded from any one of the redundant asset servers and locally stored in response to a request from the application when in communication with said content delivery network, wherein only content that is new, has changed, or is missing, and is appropriate for the particular application is downloaded;
   provide graphical information about the music file, song, or other content being played in response to a request for information from a user;
   provide a plurality of graphical representations of songs, music files, other content, albums, artists, bands or genres that are similar to or related to the song being played, where the plurality of graphical representations are arranged in a circular cloud around a graphical representation of the music file, song, or other content being played, and the distance of each graphical representation from the graphical representation of the music file, song, or other content being played is based on the degree of similarity or relatedness; and
   provide an option for a user through the circular cloud graphical representation or otherwise to play songs that were already stored on the computer and not downloaded through the content delivery network.

2. The system of claim 1, further comprising a playlist of songs.

3. The system of claim 2, wherein the playlist of songs is randomly determined.

4. The system of claim 2, wherein the playlist of songs is determined based upon the user's preferences entered in the application.

5. The system of claim 2, wherein the playlist of songs is determined based upon the user's collection of music already stored on the computer.

6. The system of claim 2, wherein the playlist of songs is determined based on the user's prior interactions with the application, and previous songs selected by the user.

7. The system of claim 2, wherein a user can skip ahead to play another song in the playlist that has not already been played.

8. The system of claim 2, wherein a user can replay a song in the playlist that was recently played.

9. The system of claim 1, wherein a song is not downloaded if that song already is stored on the computer.

10. The system of claim 1, wherein a user can purchase a song being played, or an album containing a song being played.

* * * * *